(12) United States Patent
Yamada et al.

(10) Patent No.: US 6,650,237 B2
(45) Date of Patent: Nov. 18, 2003

(54) TEMPERATURE DISPLAY SYSTEM FOR VEHICLE

(75) Inventors: Katsuhisa Yamada, Saitama (JP); Koji Kano, Saitama (JP); Koichi Shimamura, Saitama (JP); Koji Suzuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,218

(22) Filed: Mar. 29, 2001

(65) Prior Publication Data

US 2001/0043147 A1 Nov. 22, 2001

(30) Foreign Application Priority Data

Mar. 29, 2000 (JP) ........................................ 2000-091165

(51) Int. Cl.[7] ................................................. B60Q 1/00
(52) U.S. Cl. ........................ 340/449; 340/438; 340/584; 702/99; 374/100
(58) Field of Search ................................. 340/449, 438, 340/501, 517, 584, 588, 589, 691.6; 702/99, 85, 130, 136, 142; 374/100, 101, 132, 133, 141

(56) References Cited

U.S. PATENT DOCUMENTS

| 4,635,034 A | * | 1/1987 | Tokuyama et al. | .......... 340/441 |
| 5,416,728 A | * | 5/1995 | Rudzewicz et al. | ......... 702/130 |
| 5,737,243 A | * | 4/1998 | Wallrafen | .................... 702/130 |
| 5,895,117 A | * | 4/1999 | Wuertenberger | ............. 374/142 |
| 6,044,315 A | * | 3/2000 | Honeck et al. | ................ 701/35 |

FOREIGN PATENT DOCUMENTS

JP           A1212637           8/1989

* cited by examiner

*Primary Examiner*—Toan Ngoc Pham
(74) *Attorney, Agent, or Firm*—Birch, Stewart, Kolasch & Birch, LLP

(57) ABSTRACT

The display accuracy of an outside air temperature detected by a temperature sensor is to be enhanced. A CPU generates a signal for displaying an outside air temperature on a display panel P wherein the temperature is detected by an outside air temperature sensor. At this time, temperature information Tr is detected by the sensor and is corrected taking into account the vehicle speed detected by a vehicle speed sensor and an engine temperature detected by an engine temperature sensor. The CPU has a memory member for storing a correction function corresponding to the vehicle speed or the engine temperature and makes the above correction on the basis of a correction function corresponding to the vehicle speed or the engine temperature.

14 Claims, 2 Drawing Sheets

TEMPERATURE DISPLAY SYSTEM FOR VEHICLE

BACKGROUND OF THE INVENTION

1. Field of the Invention

The present invention relates to a temperature display system for a vehicle and particularly to a temperature display system for a vehicle capable of displaying an outside air temperature while taking the vehicle speed into account.

2. Description of Background Art

When a vehicle is running at a low speed due to traffic congestion for example, a temperature sensor receives radiant heat from an engine and also from road surface, and this may result in the display of a higher temperature than the actual temperature on the outside air thermometer mounted on the vehicle. To avoid such an inconvenience there has been proposed a thermometer designed such that when the vehicle speed is below a predetermined value and a detected temperature is higher than the temperature currently displayed, the contents of the display are not updated (Japanese Patent Laid Open No. 212637/89).

The above conventional thermometer involves the following problem because the display is not updated unless the vehicle speed increases above a predetermined value. For example, if a vehicle is involved in traffic congestion in the morning and is still in the congestion even despite the lapse of a relatively long time and a rise in the temperature occurs, the temperature displayed in the morning may remain as it is.

In the case where the mounting space is limited as in a two-wheeled motorcycle, an outside air temperature sensor may have to be installed in a place subject to the influence of radiant heat. However, when the vehicle speed increases to be higher than a predetermined value, the influence of radiant heat is not taken into account, so that an accurate temperature may not be displayed in a two-wheeled motorcycle which is greatly influenced by radiant heat.

SUMMARY AND OBJECTS OF THE INVENTION

It is an object of the present invention to solve the above-mentioned problems and provide a temperature display system for a vehicle capable of displaying an outside air temperature accurately even when the vehicle is running at a low speed.

For achieving the above-mentioned object, the first feature of the present invention resides in a temperature display system for a vehicle for displaying an outside air temperature on the basis of outside air temperature information detected by an outside air detecting means and vehicle speed information detected by a vehicle speed detecting means. The temperature display system includes a memory means for storing a correction function corresponding to the vehicle speed information. A correction operation means outputs temperature display data obtained by correcting the outside air temperature information with use of the correction function. A display means is provided for displaying temperature on the basis of the temperature display data.

The second feature of the present invention resides in a temperature display system for a vehicle for displaying an outside air temperature on the basis of outside air temperature information detected by an outside air detecting means and engine temperature information detected by an engine temperature detecting means. The temperature display system includes a memory means for storing a correction function corresponding to the engine temperature information. A correction operation means outputs temperature display data obtained by correcting the outside air temperature information with use of the correction function. A display means is provided for displaying temperature on the basis of the temperature display data.

According to the first feature of the invention, an outside air temperature is displayed by the display means on the basis of detected temperature information and vehicle speed. Particularly, the correction function is stored that corresponds to the vehicle speed which is used in making the display. According to the second feature of the invention, a correction function is stored that corresponds to the engine temperature which is used in making the display.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 4:
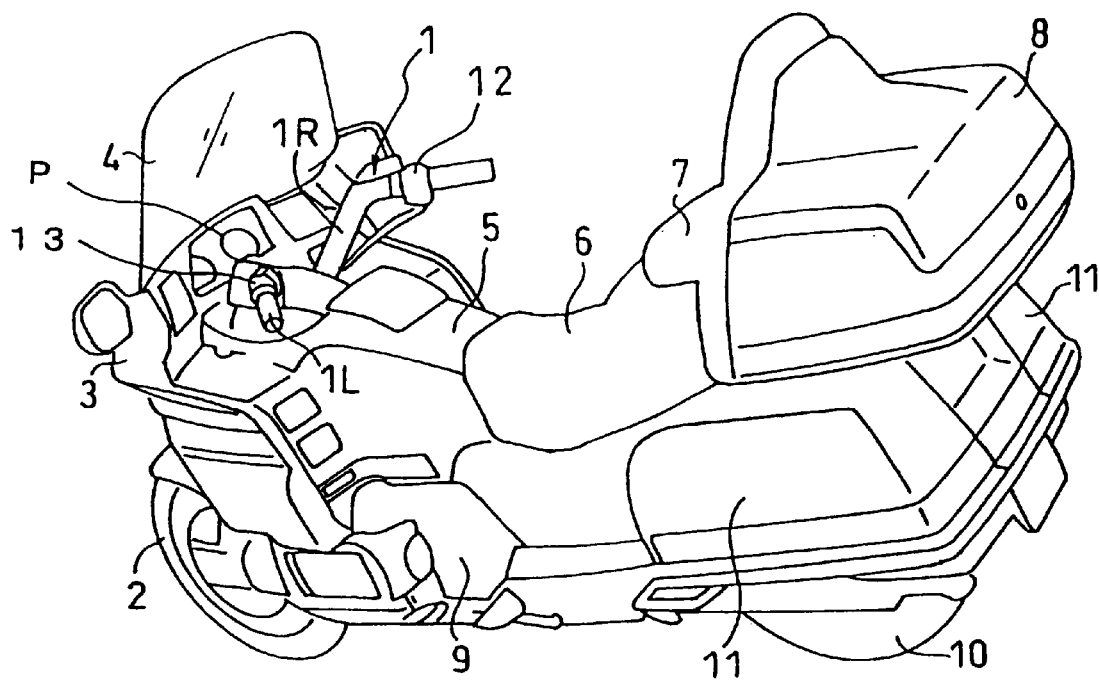
FIG. 4 is a perspective view of a two-wheeled motorcycle on which is mounted the temperature display system embodying the invention.
Figure 5:
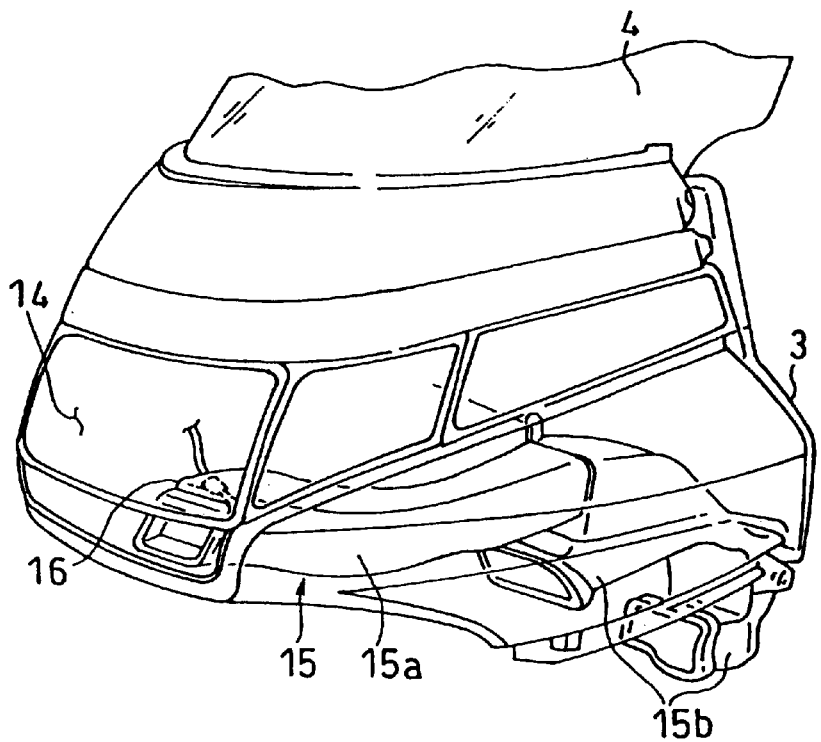
FIG. 5 is a perspective view showing a principal portion of the two-wheeled motorcycle.

An embodiment of the present invention will now be described with reference to the drawings. FIG. 4 is a perspective view of a two-wheeled motorcycle on which is mounted a temperature display system for a vehicle according to an embodiment of the present invention. As illustrated in FIG. 4, a steering handle 1 is fixed to an upper portion of a front fork (not shown) that includes a lower end that journals a front wheel 2. The steering handle 1 includes a left handle 1L and a right handle 1R. In front of the handle 1 is mounted a front fairing 3 which covers a display panel P and a lamp device as shown in FIG. 5. A windscreen 4 is mounted on top of the front fairing 3. An outside air display portion for displaying an outside air temperature is provided on the display panel P. Inside the front fairing 3 is formed an air duct (to be described later in connection with FIG. 5) for introducing air from the front side of the vehicle body and feeding it to a rider side.

Near the grip of the right handle 1R is disposed a right switch panel 12 which is provided with a starter, a reverse switch and a reverse shift switch. Near the grip of the left handle 1L is disposed a left switch panel 13 which includes a group of indicating and warning switches, a group of audio switches, and a group of switches for a CB.

A fuel tank 5, a rider seat 6, a fellow passenger seat 7, and a rear box 8 are disposed in this order from the front fairing 3 toward the rear of the vehicle body. Below the fuel tank 5 is mounted an engine 9, while below the rear box 8 is positioned a rear wheel 10 and side boxes 11 are mounted so as to cover the right and left sides of an upper portion of the rear wheel 10.

FIG. 5 is a perspective view of a front portion of a vehicle body. As illustrated in FIG. 5, a lamp device 14 is installed in a central part of the front fairing 3 and an air duct 15 is disposed below the lamp device 14. The air duct 15, which in FIG. 5 is seen through the front fairing 3, comprises an upper air duct 15a for introducing air from the front portion side of the vehicle body and a lower air duct 15b for introducing air from a lower portion of the vehicle body. The air flowing from both air ducts is joined and the joint flow is discharged to the rider side from an air feed port (not shown).

A temperature sensor 16 is disposed near an inlet formed in the air duct 15. The temperature sensor 16 thus installed within the air duct is difficult to be influenced by radiant heat because it receives an air current and therefore can output accurate temperature information. However, during the operation of the vehicle at a low-speed, the temperature sensor 16 may undergo an influence due to radiant heat, so there is provided a correction means which will be described later. The temperature information detected by the temperature sensor 16 is inputted to a control unit to be described later, in which it is converted into a signal indicative of the temperature. The signal is then fed to the temperature display portion on the display panel P mounted in the front of the vehicle.

Figure 1:
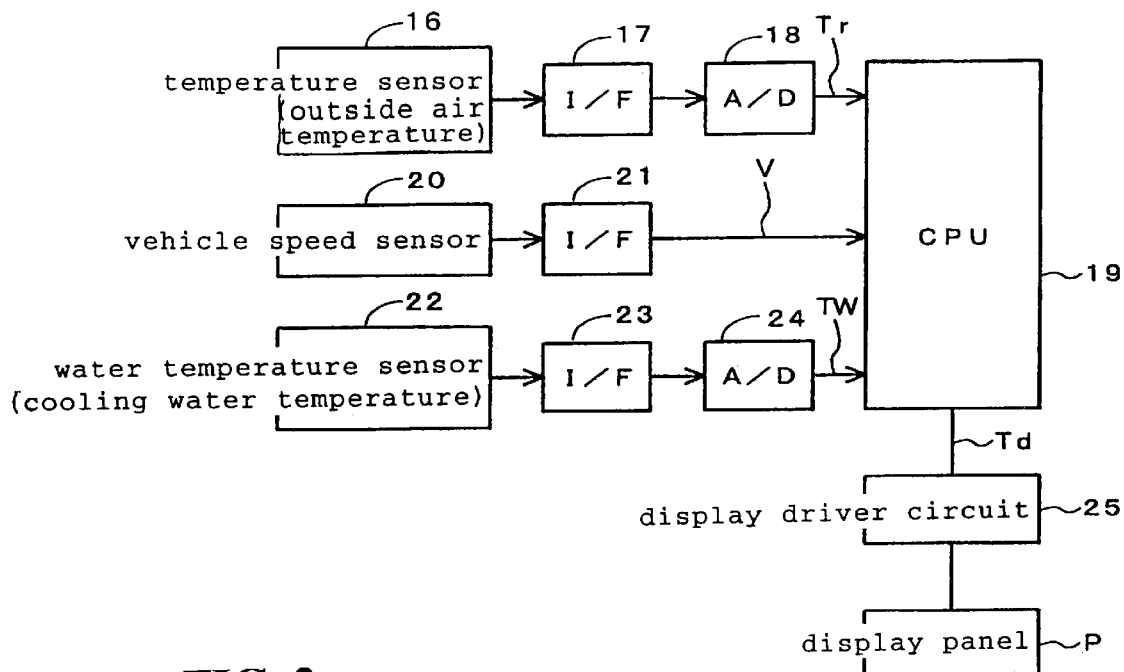
FIG. 1 is a block diagram showing a hardware configuration of a temperature display system according to an embodiment of the present invention.

FIG. 1 is a block diagram showing a hardware configuration of the outside air temperature display system embodying the invention. In FIG. 1, the outside air temperature sensor 16 may be a thermistor whose resistance value varies according to temperature. An interface 17 converts the resistance value information outputted from the temperature sensor 16 into a voltage signal and outputs the signal. The voltage signal is then converted to a digital signal in an A/D converter 18, which is inputted as outside air temperature information Tr into a CPU 19. On the other hand, a vehicle speed sensor 20 is disposed, for example, near a transmission output shaft of the engine and outputs a pulse signal responsive to a vehicle speed which is represented by the number of revolutions of the output shaft. The pulse signal is wave-shaped in an interface 21 and is then inputted as vehicle speed information V to the CPU 19.

In this embodiment, temperature display data Td can be displayed with the engine temperature taken into account. Cooling water temperature in the engine detected by a water temperature sensor 22 represents the temperature of the engine. This engine temperature information TW is converted to a voltage signal in an interface 23, which voltage signal is then converted to a digital signal in an A/D converter 24. The digital signal is then inputted to the CPU 19.

On the basis of the temperature information Tr and the vehicle speed information V and/or engine temperature information TW the CPU 19 outputs temperature display data Td. A display driver circuit 25 converts the temperature display data Td into a signal capable of being displayed on the display panel P and outputs the signal to the display panel. In response to the signal fed from the display driver circuit 25 the display panel P displays an outside air temperature digitally for example.

Figure 2:
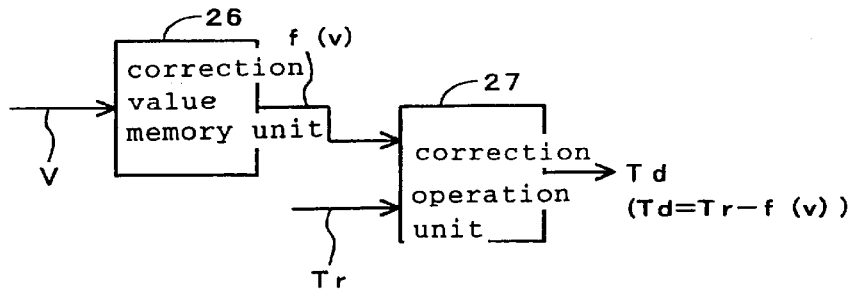
FIG. 2 is a functional block diagram of a correction control section taking the vehicle speed into account.

The following description is now provided about principal functions of the CPU 19 for the display of temperature. FIG. 2 is a block diagram showing the principal functions of the CPU 19. A correction value memory unit 26 may be a memory such as a ROM that stores a correction function f(v) corresponding to a vehicle speed V. In response to an inputted vehicle speed V the correction value memory unit 26 outputs the correction function f(v). A correction operation unit 27 calculates temperature display data Td, taking the correction function f(v) into account, on the basis of the outside air temperature information Tr and in accordance with the following equation (F1):

$$Td=Tr-f(v) \qquad F1$$

Figure 3:
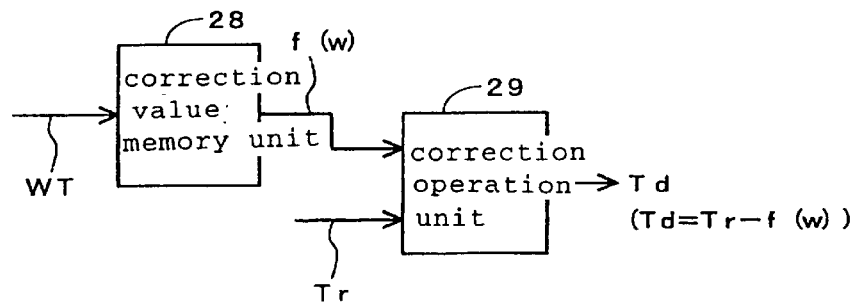
FIG. 3 is a functional block diagram of a correction control section taking the engine temperature into account.

FIG. 3 is a functional block diagram of the CPU 19 for the calculation of temperature display data with engine temperature taken into account. A correction value memory unit 28 may be a memory such as a ROM that stores a correction function f(w) corresponding to engine temperature information TW. In response to inputted engine temperature information TW the correction value memory unit 28 outputs the correction function f(w). A correction operation unit 29 calculates temperature display data Td, taking the correction function f(w) into account, on the basis of the outside air temperature information Tr and in accordance with the following equation (F2):

$$Td=Tr-f(w) \qquad F2$$

In this embodiment the temperature display data Td is calculated taking into account the correction function f(v) or f(w) corresponding to vehicle speed information V or engine temperature information TW. However, the temperature display data Td may be calculated taking into account the correction functions f(v,w) related to both vehicle speed information V and engine temperature information TW. That is, the temperature display data Td may be calculated in accordance with the following equation F3:

$$Td=Tr-f(v,w) \qquad F3$$

In the above construction, for example the correction function f(v) is set so as to become smaller with an increase in the value of vehicle speed information V This is for the following reason. As the vehicle speed increases and the vehicle comes to undergo a strong air current, the temperature sensor 16 is less influenced by radiant heat from the engine, etc., so that the amount of correction for the detected temperature information Tr may be small. In contrast therewith, if the vehicle speed is low, the influence of such radiant heat exerted on the temperature sensor becomes greater, resulting in that the temperature information Tr becomes larger. In this case, since the correction function f(v) becomes large, the temperature display data Td becomes data corrected lower than the detected temperature information Tr and thus a correct outside air temperature is displayed.

On the other hand, the correction function f(w) is set so that when the engine temperature information TW is small, that is, the colder the engine, the smaller the amount of corrected temperature information Tr. This is because when the engine temperature is low, the influence of radiant heat is small and therefore the necessity of correction is low. As the engine temperature information TW becomes larger, the influence of radiant heat becomes greater, but since the correction function f(w) becomes large, the temperature information Tr is corrected so as to become smaller and thus a correct outside air temperature is displayed. That is, when the vehicle is running continuously at a low speed or is started after a short-time stop, the radiant heat from the engine exerts an influence on the temperature sensor, but in such a case, since the engine cooling water temperature is high, the correction quantity of the temperature information Tr detected by the temperature sensor 16 becomes large and the display temperature becomes low, whereby a correct outside air temperature is displayed.

In the conventional temperature display system wherein the temperature display is not updated when the vehicle speed is lower than a preset value, there occurs no change in the temperature display despite an actual increase in the temperature to be displayed. But in this embodiment of the present invention the engine cooling water temperature is taken into account, and when the engine temperature rises due to operating the vehicle at a low-speed, the amount of correction is increased and the temperature display is updated, whereby a correct outside air temperature can be displayed.

As will be apparent from the above description, according to the present invention, the outside air temperature is displayed on the display means on the basis of detected temperature information and vehicle speed. Particularly, a correction function is stored that corresponds to the vehicle speed is taken into account in making the display. Therefore, even if the temperature detecting means is installed in a position apt to be influenced by radiant heat, the display temperature is corrected taking into account the influence of radiant heat which varies depending on the vehicle speed.

According to the present invention, a correction function is stored that corresponds to the engine temperature and is taken into account in making the display. Therefore, the magnitude of the engine radiant heat is determined on the basis of engine temperature and is taken into account in the display of temperature.

Thus, according to the present invention, the influence of radiant heat can be diminished and therefore the layout freedom is enhanced. For example, the temperature detecting means can be disposed even closer to the engine where the influence of radiant heat may be exerted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A temperature display system for a vehicle for displaying an outside air temperature on the basis of outside air temperature information detected by an outside air detecting means and vehicle speed information detected by a vehicle speed detecting means, said temperature display system comprising:

a memory means for storing a variable correction function depended on said vehicle speed information;

a correction operation means for outputting temperature display data obtained by correcting said outside air temperature information with use of said correction function; and a display means for displaying temperature on the basis of said temperature display data.

2. The temperature display system for a vehicle according to claim 1, wherein said outside air temperature information is detected by a temperature sensor mounted relative to the exterior portion of the vehicle.

3. The temperature display system for a vehicle according to claim 2, wherein the temperature sensor is mounted in an air duct that receives an air current during operation of the vehicle.

4. The temperature display system for a vehicle according to claim 2, wherein the temperature sensor is a thermistor with a resistance value that varies according to the temperature.

5. The temperature display system for a vehicle according to claim 4, and further including an interface for converting resistance value information outputted from the temperature sensor into a voltage signal, and a converter for receiving said voltage signal to a digital signal for inputting into central processing unit.

6. The temperature display system for a vehicle according to claim 5, wherein said vehicle speed detecting means includes a speed sensor operatively mounted relative to a transmission output shaft for outputting a pulse signal responsive to the vehicle speed, said pulse signal responsive to the vehicle speed being inputted into said central processing unit.

7. A temperature display system for a vehicle for displaying an outside air temperature on the basis of outside air temperature information detected by an outside air detecting means and engine temperature information detected by an engine temperature detecting means, said temperature display system comprising:

a memory means for storing a variable correction function depended on said engine temperature information;

a correction operation means which outputs temperature display data obtained by correcting said outside air temperature information with use of said correction function; and a display means which displays temperature on the basis of said temperature display data.

8. The temperature display system for a vehicle according to claim 7, wherein said outside air temperature information is detected by a temperature sensor mounted relative to the exterior portion of the vehicle.

9. The temperature display system for a vehicle according to claim 8, wherein the temperature sensor is mounted in an air duct that receives an air current during operation of the vehicle.

10. The temperature display system for a vehicle according to claim 8, wherein the temperature sensor is a thermistor with a resistance value that varies according to the temperature.

11. The temperature display system for a vehicle according to claim 10, and further including an interface for converting resistance value information outputted from the temperature sensor into a voltage signal, and a converter for receiving said voltage signal to a digital signal for inputting into central processing unit.

12. The temperature display system for a vehicle according to claim 11, further comprising a vehicle speed detecting means including a speed sensor operatively mounted relative to a transmission output shaft for outputting a pulse signal responsive to the vehicle speed, said pulse signal responsive to the vehicle speed being inputted into said central processing unit.

13. The temperature display system for a vehicle according to claim 7, wherein the engine temperature detecting means includes a temperature sensor for detecting the temperature of the engine and generating an output signal.

14. The temperature display system for a vehicle according to claim 13, and further including an interface for receiving the output signal from the engine temperature detecting means and converting the signal to a voltage signal that is further converted to a digital signal that is inputted into a central processing unit.

* * * * *